(12) United States Patent
Shirai

(10) Patent No.: US 12,449,955 B2
(45) Date of Patent: Oct. 21, 2025

(54) CONTROL APPARATUS THAT CONTROLS DISPLAY OF MENUS IN ACCORDANCE WITH INPUT OR A PASSWORD, CONTROLLING METHOD FOR CONTROL APPARATUS, AND STORAGE MEDIUM

(71) Applicant: CANON KABUSHIKI KAISHA, Tokyo (JP)

(72) Inventor: Hayato Shirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 18/365,541

(22) Filed: Aug. 4, 2023

(65) Prior Publication Data

US 2024/0053866 A1 Feb. 15, 2024

(30) Foreign Application Priority Data

Aug. 9, 2022 (JP) .................................. 2022-127039

(51) Int. Cl.
*G06F 3/048* (2013.01)
*G06F 1/3231* (2019.01)
*G06F 3/0482* (2013.01)
*G06F 3/0483* (2013.01)
*G06F 21/36* (2013.01)

(52) U.S. Cl.
CPC .......... *G06F 3/0482* (2013.01); *G06F 1/3231* (2013.01); *G06F 3/0483* (2013.01); *G06F 21/36* (2013.01)

(58) Field of Classification Search
CPC ...... G06F 1/3231; G06F 21/36; G06F 3/0482; G06F 3/0483; G06F 3/0416; G06F 3/12052; G06F 3/1237; H04N 1/00167; H04N 1/00209
See application file for complete search history.

(56) References Cited

U.S. PATENT DOCUMENTS

| 11,416,182 B2 | 8/2022 | Shirai et al. ............... G06F 3/12 |
| 2005/0111857 A1* | 5/2005 | Negishi .............. G03G 15/6508 |
| | | 399/80 |

(Continued)

FOREIGN PATENT DOCUMENTS

JP  2020-052972  4/2020

OTHER PUBLICATIONS

U.S. Appl. No. 18/362,002, filed Jul. 31, 2023.

(Continued)

*Primary Examiner* — Mahelet Shiberou
(74) *Attorney, Agent, or Firm* — Venable LLP

(57) ABSTRACT

A control apparatus includes a first display controller that displays selection areas on a display unit, a locking unit that controls the control apparatus in a locked state, a changing unit that changes the state of the control apparatus from the locked state to a released state based on input of a password in the state of the control apparatus controlled in the locked state, a second display controller that displays a second menu screen corresponding to a second selection area on the display unit based on selection of the second selection area, and a third display controller that displays the second menu screen without the input of the password in a case where the second menu screen is displayed after the change from the locked state to the released state and the first selection area is selected after the display of the second menu screen.

20 Claims, 9 Drawing Sheets

(56) References Cited

U.S. PATENT DOCUMENTS

| | | | | |
|---|---|---|---|---|
| 2016/0156804 A1* | 6/2016 | Suzuki | ............... | H04N 1/00498 |
| | | | | 358/1.11 |
| 2016/0269384 A1* | 9/2016 | Suga | .................... | H04L 63/107 |
| 2019/0306346 A1* | 10/2019 | Nakamura | .......... | H04N 1/00432 |
| 2019/0356797 A1* | 11/2019 | Nagasawa | .......... | H04N 1/00498 |
| 2020/0336614 A1 | 10/2020 | Liu | .................... | H04N 1/00432 |

OTHER PUBLICATIONS

U.S. Appl. No. 18/490,461, filed Oct. 19, 2023.
U.S. Appl. No. 18/490,479, filed Oct. 19, 2023.
U.S. Appl. No. 18/490,492, filed Oct. 19, 2023.
U.S. Appl. No. 18/490,509, filed Oct. 19, 2023.

* cited by examiner

CONTROL APPARATUS THAT CONTROLS DISPLAY OF MENUS IN ACCORDANCE WITH INPUT OR A PASSWORD, CONTROLLING METHOD FOR CONTROL APPARATUS, AND STORAGE MEDIUM

BACKGROUND

Field

The present disclosure relates to a technique for controlling a display screen.

Description of the Related Art

Japanese Patent Laid-Open No. 2020-52972 (hereinafter referred to as Reference 1) discloses a multifunction peripheral that displays a shortcut list screen in a tab format. The aforementioned multifunction peripheral displays a common tab in a general mode in a case where a registered user does not log in. On the other hand, in a personal mode in a case where the registered user logs in, the multifunction peripheral displays the common tab, and a personal tab that corresponds to the user who logs in. In the meantime, the personal tab is managed to be accessible by password authentication or authentication by using a card.

SUMMARY

However, if a user carries out an operation in such a way as to go back and forth between two tabs or more, for example, there may be a case where a tab that has once successfully authenticated the user will require authentication again, and operability may be degraded in this case.

A control apparatus according to an aspect of the present disclosure includes: a first display controller configured to display a plurality of selection areas on a display unit; a locking unit configured to control the control apparatus in a locked state being a state controlled in such a way that a first menu screen corresponding to a first selection area is not displayed even in a case where the first selection area is selected from the plurality of selection areas; a changing unit configured to change the state of the control apparatus from the locked state to a released state based on carrying out an input of a predetermined password in the state where the control apparatus is controlled in the locked state, the released state being a state controlled in such a way that display of the first menu screen is enabled; a second display controller configured to display a second menu screen corresponding to a second selection area being different from the first selection area on the display unit based on selection of the second selection area from the plurality of selection areas; and a third display controller configured to display the second menu screen without carrying out the input of the predetermined password in a case where the second menu screen is displayed after changing the state of the control apparatus from the locked state to the released state and the first selection area is selected after displaying the second menu screen.

Further features of the present invention will become apparent from the following description of exemplary embodiments with reference to the attached drawings.

DESCRIPTION OF THE EMBODIMENTS

An embodiment of the present disclosure will be described below with reference to the drawings. It is to be noted that the following embodiment is not intended to limit the scope of the present disclosure, and that the entire combination of features described in the present embodiment is not always essential for a solution of the present disclosure. In the description, the same structures will be denoted by the same reference signs.

First Embodiment

<Block Diagram>

Figure 1:
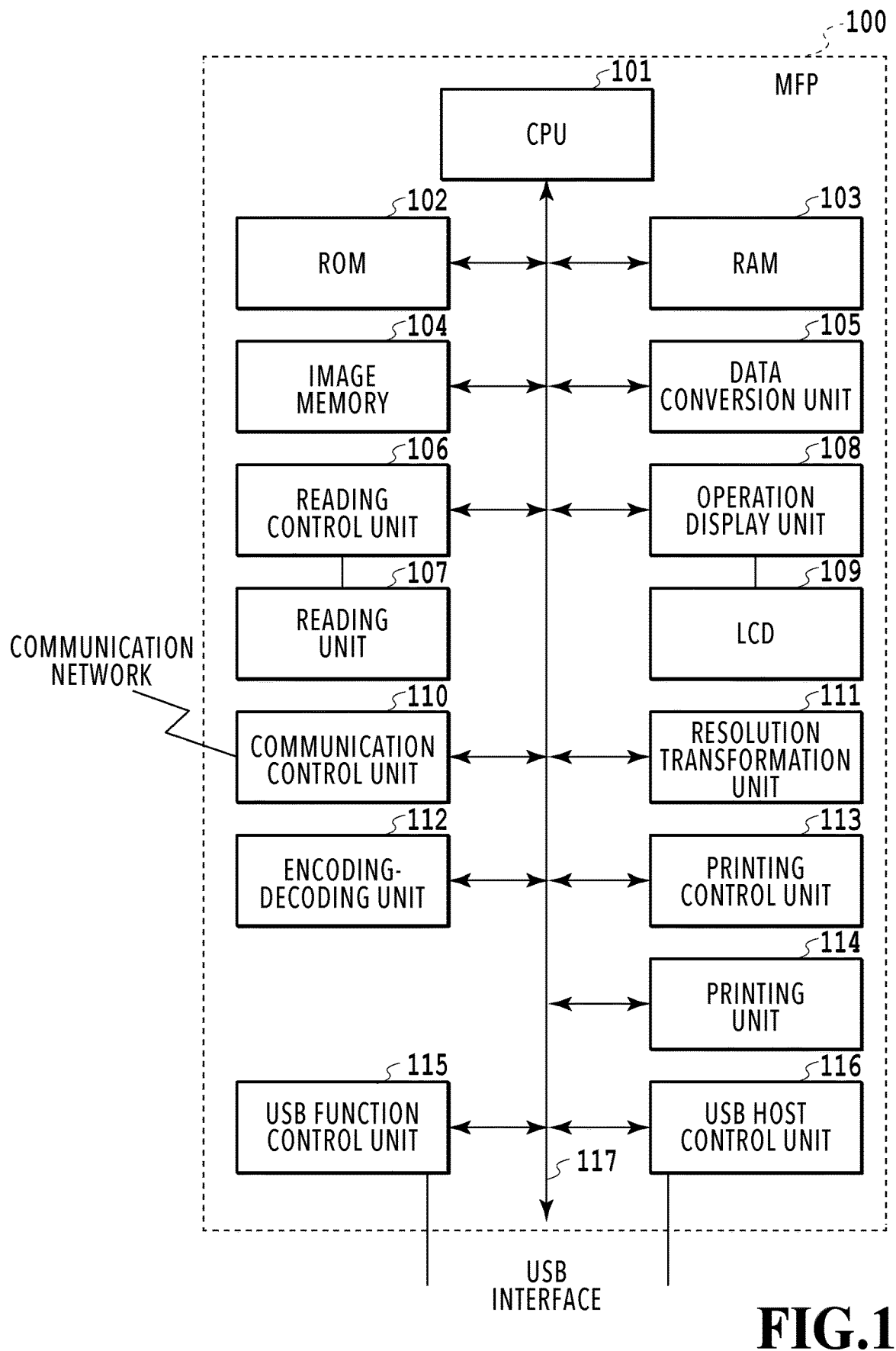
FIG. 1 is a block diagram of an MFP.

FIG. 1 is a block diagram showing a schematic configuration example of an MFP 100 of the present embodiment. The MFP 100 is one type of an information processing apparatus. Meanwhile, the MFP 100 is one type of an electronic device. The MFP 100 of the present embodiment is provided with information processing functions such as generation, storage, transmission, and the like of device information inclusive of log information and status information. Moreover, the MFP 100 includes an image formation function to form an image on a print medium by using a printing control unit 113 and a printing unit 114 to be described later.

The MFP 100 includes a CPU 101, a ROM 102, a RAM 103, an image memory 104, a data conversion unit 105, a reading control unit 106, a reading unit 107, an operation display unit 108, an LCD 109, a communication control unit 110, and a resolution transformation unit 111. The MFP 100 further includes an encoding-decoding unit 112, the printing control unit 113, the printing unit 114, a USB function control unit 115, a USB host control unit 116, and a bus 117.

The CPU 101 is a system control unit that controls the entire MFP 100. The ROM 102 is a non-volatile memory that stores fixed data including control programs to be executed by the CPU 101, data tables, an embedded operating system (OS), and the like. In the present embodiment, the respective control programs stored in the ROM 102 undergo software execution control such as scheduling, task switching, and interrupt processing under the supervision of the embedded OS stored in the ROM 102. The ROM 102 stores information indicating a state of permission that indicates whether or not to deliver device information to outside. The RAM 103 is formed from a device such as a static random access memory (SRAM) that requires a backup power supply. Power supply to the RAM 103 is guaranteed by a not-illustrated primary battery for data backup. Program control variables and the like are stored in the RAM 103. The image memory 104 is formed from a device such as a dynamic random access memory (DRAM) and is capable of accumulating image data. Moreover, a certain area of the image memory 104 is secured as an operating area for executing the software processing. The data conversion unit 105 can perform conversion of image data such as an analysis of a page description language (PDL) and computer graphics (CG) development of character data.

The reading unit 107 optically reads an original with a CIS image sensor and converts the read original into an electrical image signal. The reading control unit 106 subjects this image signal to a variety of image processing such as binarization processing and halftone processing, thereby outputting high-definition image data. Here, the method of optically reading the original may be either a sheet reading control mode of reading the original with the fixed CIS image sensor or a book reading control mode of reading the original fixed to a platen with the movable CIS image sensor.

The operation display unit 108 is formed from bare essentials of keys including numerical value input keys, mode setting keys, a select kay, a cancel key, and the like, light emitting diodes (LEDs), seven-segment display units, and so forth. The various keys mentioned above are realized by so-called soft keys displayed on the LCD 109, so that the soft keys can accept an operation by a user. In order to reduce power consumption, the LCD 109 switches off a backlight for the LCD 109 in a case where the user does not perform any operations for a predetermined period of time.

The communication control unit 110 controls communication between the MFP 100 and a communication network 300, and conducts connection to an Internet service provider, or communication of various data to and from a service management server 200. Moreover, the communication control unit 110 can determine whether the MFP 100 is connected to the Internet or is connected only to a LAN. Here, connection between the communication control unit 110 and the communication network 300 is assumed to be established based on a publicly known method such as the HTTP and the XMPP. The resolution transformation unit 111 performs resolution transformation processing such as inter-conversion between millimeter-based image data and ink-based image data. Note that the resolution transformation unit 111 can also execute scaling processing of the image data.

The encoding-decoding unit 112 subjects the image data (uncompressed, MH, MR, MMR, JBIG, JPEG, and so forth) treated by the MFP 100 to encoding and decoding processing as well as the scaling processing. The printing control unit 113 subjects the image data to be printed to a variety of image processing such as smoothing processing, print density correction processing, and color correction, thereby converting the image data into high-definition image data and outputting the high-definition image data to the printing unit 114. Moreover, the printing control unit 113 also plays a role for regularly obtaining status information data on the printing unit 114. The printing unit 114 is formed from a laser beam printer, an ink jet printer, or the like and prints the image data generated by the printing control unit 113 on a print medium such as a paper sheet.

The USB function control unit 115 conducts protocol control in accordance with a USB communication standard. The USB host control unit 116 is a control unit for carrying out the communication in accordance with the protocol defined by the USB communication standard. This USB communication standard is a standard for bidirectional high-speed data communication. According to this USB communication standard, it is determined that two or more hubs or functions (slaves) can be connected to one host (a master). That is to say, the USB host control unit 116 provides a function as a host in the USB communication. Structures other than the reading unit 107 and the LCD 109 are connected to one another through the bus 117.

<Operation Display Unit>

The operation display unit 108 according to the present embodiment includes a screen in a tab format.

Figure 2:
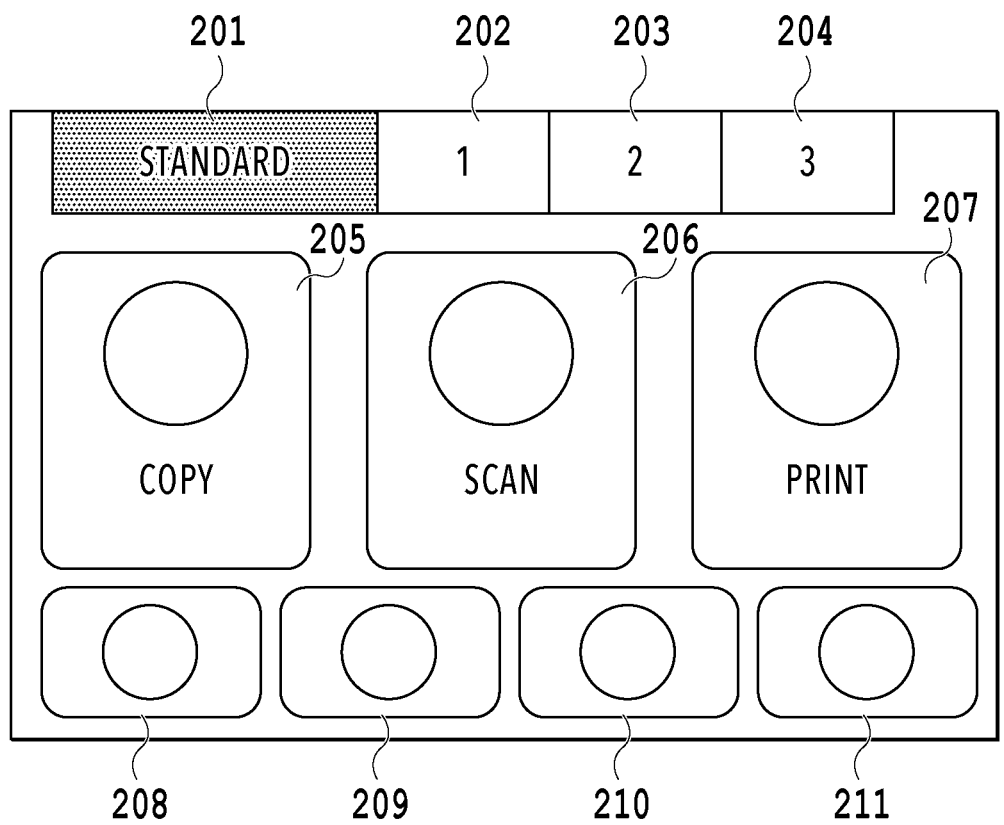
FIG. 2 is a diagram showing a standard home screen to be displayed on an operation display unit.

FIG. 2 is a diagram showing a standard home screen to be displayed on the operation display unit 108. A tab 201 is a tab corresponding to the standard home screen. Tabs 202, 203, and 204 are each a tab corresponding to a custom home screen. A user can switch the home screen by pressing any of the tabs. Moreover, a tab color of the tab 201 is changed from a color of other tabs, thereby indicating that the screen on the tab 201 (that is, the standard home screen) is displayed at the moment. The standard home screen includes a copy menu button 205, a scan menu button 206, a print menu button 207, a LAN button 208, a wireless connection button 209, a setting button 210, and a clue button 211. In the case where the user presses each of these buttons, the display transitions to a screen corresponding to each of the buttons. To be more precise, either an area for inputting copy settings or a screen for instructing execution of copying is displayed in the case where the copy menu button 205 is pressed, for example. The standard home screen is assumed to display predetermined buttons without allowing arbitrary selection by the user unlike custom home screens to be described later. However, without limitation to this configuration, the buttons to be displayed on the standard home screen may be configured to be arbitrarily selectable or changeable by the user.

Figure 3:
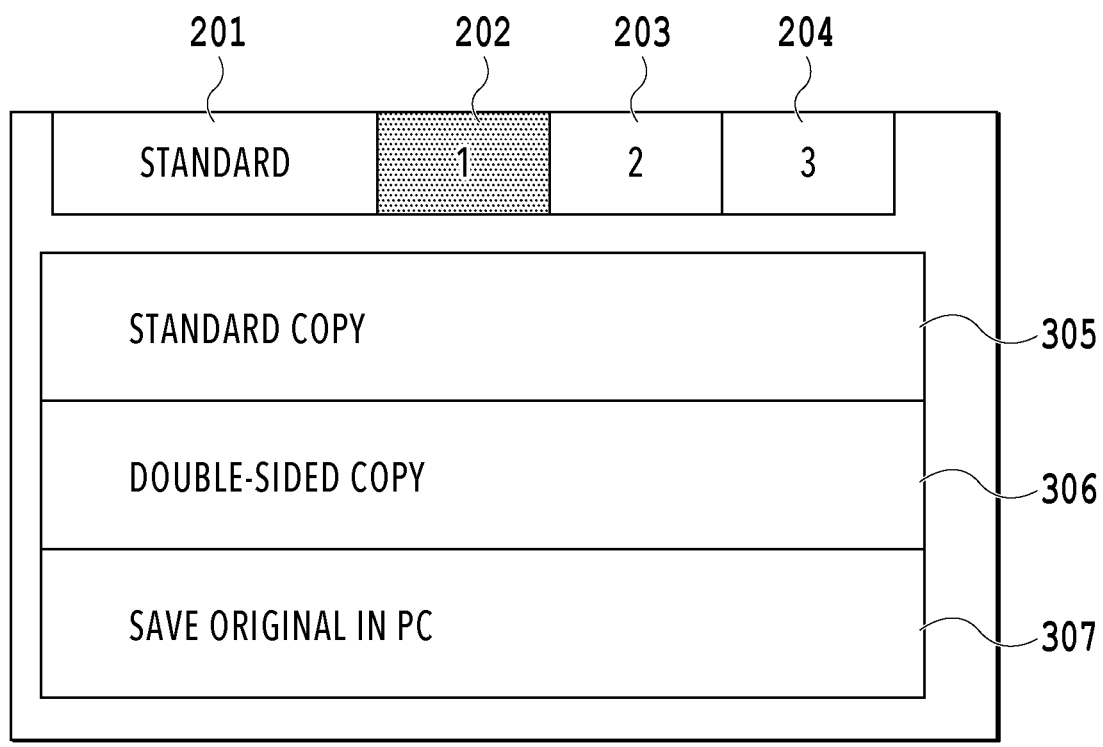
FIG. 3 is a diagram showing a custom home screen to be displayed on the operation display unit.

FIG. 3 is a diagram showing a custom home screen corresponding to the tab 202 displayed on the operation display unit 108. A tab color of the tab 202 is changed from the color of other tabs, thereby indicating that the custom home screen corresponding to the tab 202 is displayed at the moment. The custom home screen corresponding to the tab 202 includes custom menus 305, 306, and 307. Each of the menus can be customized by the user, and the user can designate functions to be displayed on respective menu positions. In FIG. 3, "standard copy" is set to the custom menu 305, "double-sided copy" is set to the custom menu 306, and "save original in PC" is set to the custom menu 307, respectively. Unlike the standard home screen, each custom home screen enables registration of each menu linked to a setting of processing to be executed from the menu. Specifically, in the case of the copying to be executed from the copy menu button 205, for example, it is necessary to set whether or not such a copy is a double-sided copy or a single-sided copy separately after pressing the copy menu button 205. However, regarding the copying executed from the custom menu 306, it is not necessary to set whether or not the copy is a double-sided copy or a single-sided copy separately after pressing the custom menu 306. Meanwhile, either log-in information or cookie information may be saved while being linked to each home screen. In the meantime, it is possible to set a lock for each custom home screen. In the present embodiment, the lock means control not to allow display of the custom home screen without input of an accurate password to a password input screen. Regarding a custom home screen without the setting of the lock, the relevant custom home screen is displayed without presentation of the password input screen once the tab corresponding to the custom home screen is operated. The setting of the custom menus on the custom home screens and the lock setting can be carried out by using the setting button 210 in FIG. 2.

Figure 4:
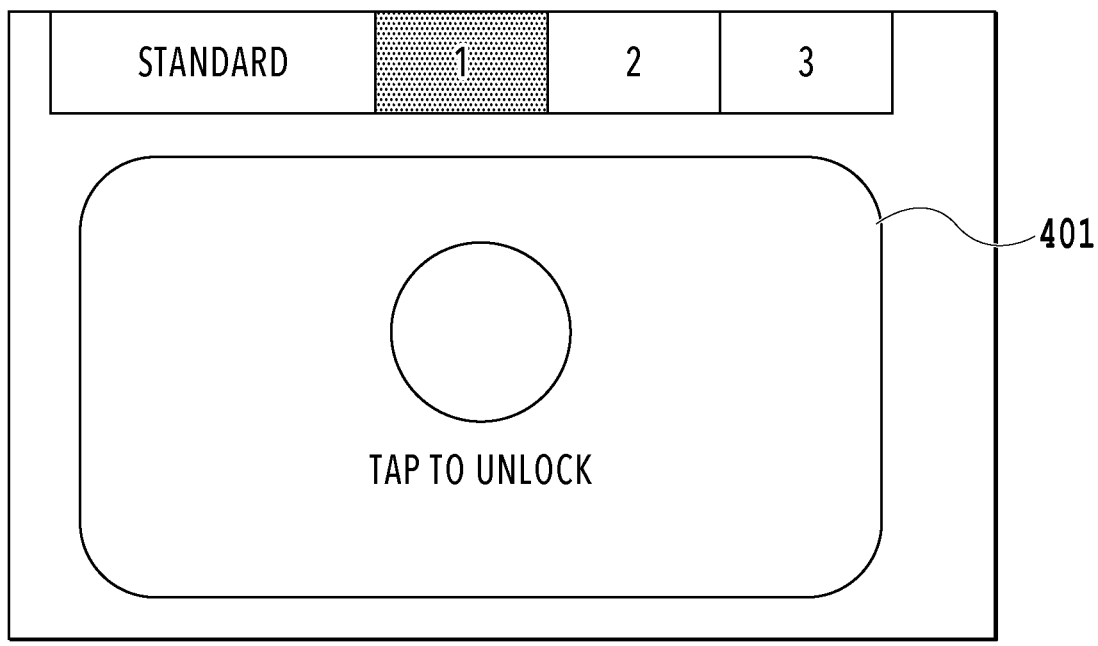
FIG. 4 is a diagram showing a custom home lock screen to be displayed on the operation display unit.

FIG. 4 is a diagram showing a lock screen for the tab 202 displayed on the operation display unit 108. In the case where the user selects the tab 202 which is the tab corresponding to the locked custom home screen, the screen shown in FIG. 4 is displayed instead of displaying the custom home screen. The password input screen is displayed in the case where the user presses an unlock button 401, and the custom home screen corresponding to the tab 202 is displayed in the case where the inputted password matches the accurate password. Here, the accurate password is set for each tab.

According to the present embodiment, in the case where the tab 202 is pressed again after displaying a menu of a different tab is displayed after displaying the custom home screen of the tab 202 being currently displayed, the custom home screen corresponding to the tab 202 is displayed without displaying the lock screen or causing the user to input the password.

Figure 5:
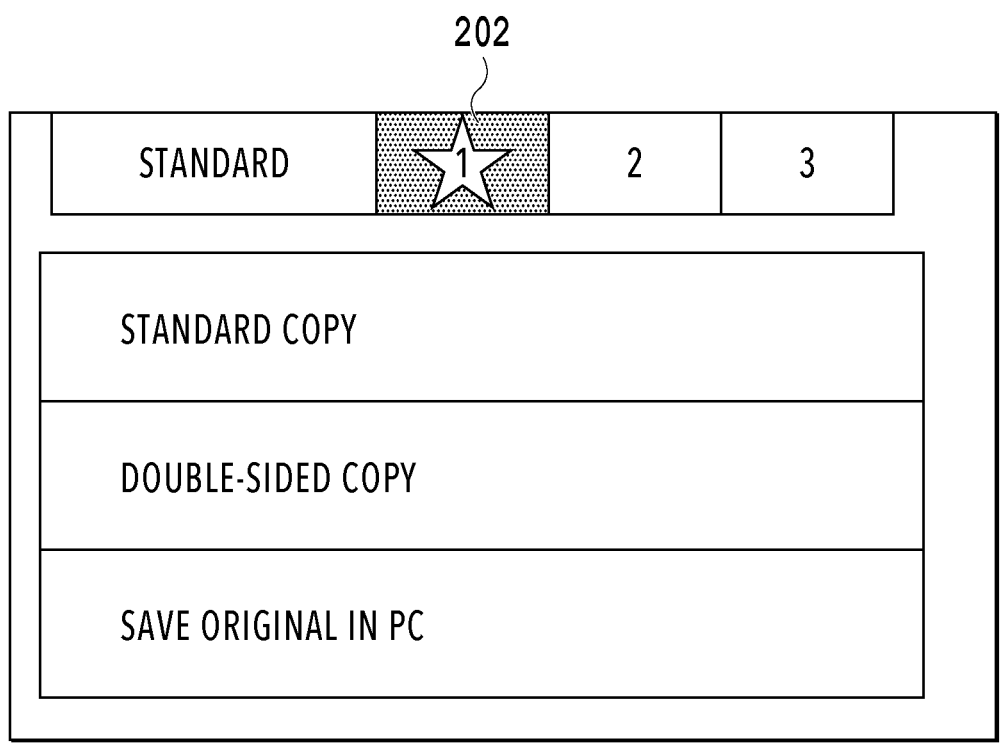
FIG. 5 is a diagram showing the unlocked custom home screen to be displayed on the operation display unit.

FIG. 5 shows an unlocked custom home screen to be displayed on the operation display unit 108. An unlocked icon 501 indicates that the lock setting of the currently displayed custom home screen corresponding to the tab 202 is released.

In the present embodiment, the user can lock the tab by pressing an unlocked icon (namely, the tab 202 in FIG. 5). Note that the unlocked icon 501 is not displayed on a tab for which the lock setting is disabled, so that no processing is carried out even in the case of pressing the tab of the currently displayed custom home screen. Here, the setting to enable or disable the lock setting of the tab is assumed to be carried out in advance for each tab. The setting to enable or disable the lock setting of the tab may be carried out by using the setting button 210, for example.

<Flowchart>

Figure 6:
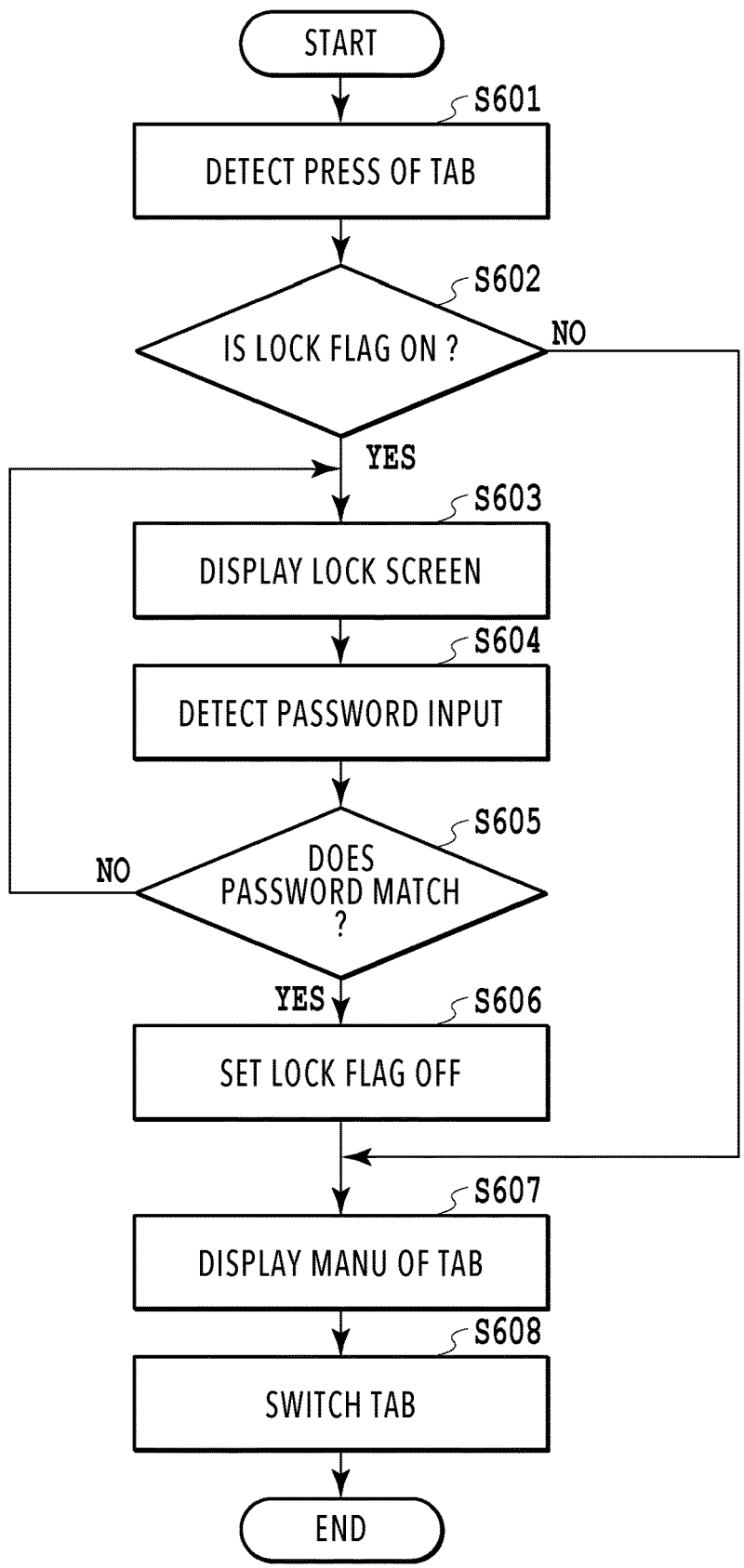
FIG. 6 is a flowchart showing a sequence to unlock the custom home screen.

FIG. 6 is a flowchart for explaining an unlock sequence of the present embodiment. A flow of the processing to unlock the tab by the user will be explained with reference to FIG. 6. A series of processing shown in this flowchart is implemented by causing the CPU 101 of the MFP 100 to load program codes stored in the ROM 102 into the RAM 103 and to execute the program codes. Note that code "S" in the following description of each procedure means a step in the flowchart. The same applies to the following description of the embodiment. This processing is executed in the case where the user presses the tab on the custom home screen. Moreover, this processing is started in the case where the operation display unit 108 detects an operation by the user such as the touching.

First, in S601, the CPU 101 detects the tab pressed by the user. In S602, the CPU 101 determines whether or not a lock flag of the tab is on. The lock flag of the tab is prepared for each tab and is turned on in the case where a locking operation of the tab takes place. Details of the locking operation of the tab will be described later. In the case where the lock flag is off, the CPU 101 displays the menu of the tab in S607. Note that the lock flag of a tab disabled for the lock setting is always off. As described earlier, the setting to enable or disable the lock setting of the tab is assumed to be carried out in advance for each tab.

In the case where the lock flag is on, the CPU 101 displays the lock screen as shown in FIG. 4 in S603. In the case where the CPU 101 detects the input of the password by the user in S604, the CPU 101 determines whether or not the password matches in S605. In the case where the password does not match, the lock screen is displayed again in S603. In the case where the password matches, the CPU 101 sets the lock flag off in S606, and then displays the menu of the tab in S607.

In the case where switching to another tab is carried out by the user operation in S608, the CPU 101 keeps the state of the lock flag in the off state regarding the tab before the switching for which the lock flag is turned off in S606. Thus, the lock flag will be determined to be off in S602 in the case where the press of the tab is detected again in S601, so that the user can display the menu of the tab without inputting the password. This is the flow of the processing in the case of unlocking the tab.

Next, a description will be given of processing to lock the tab by the user.

Figure 7:
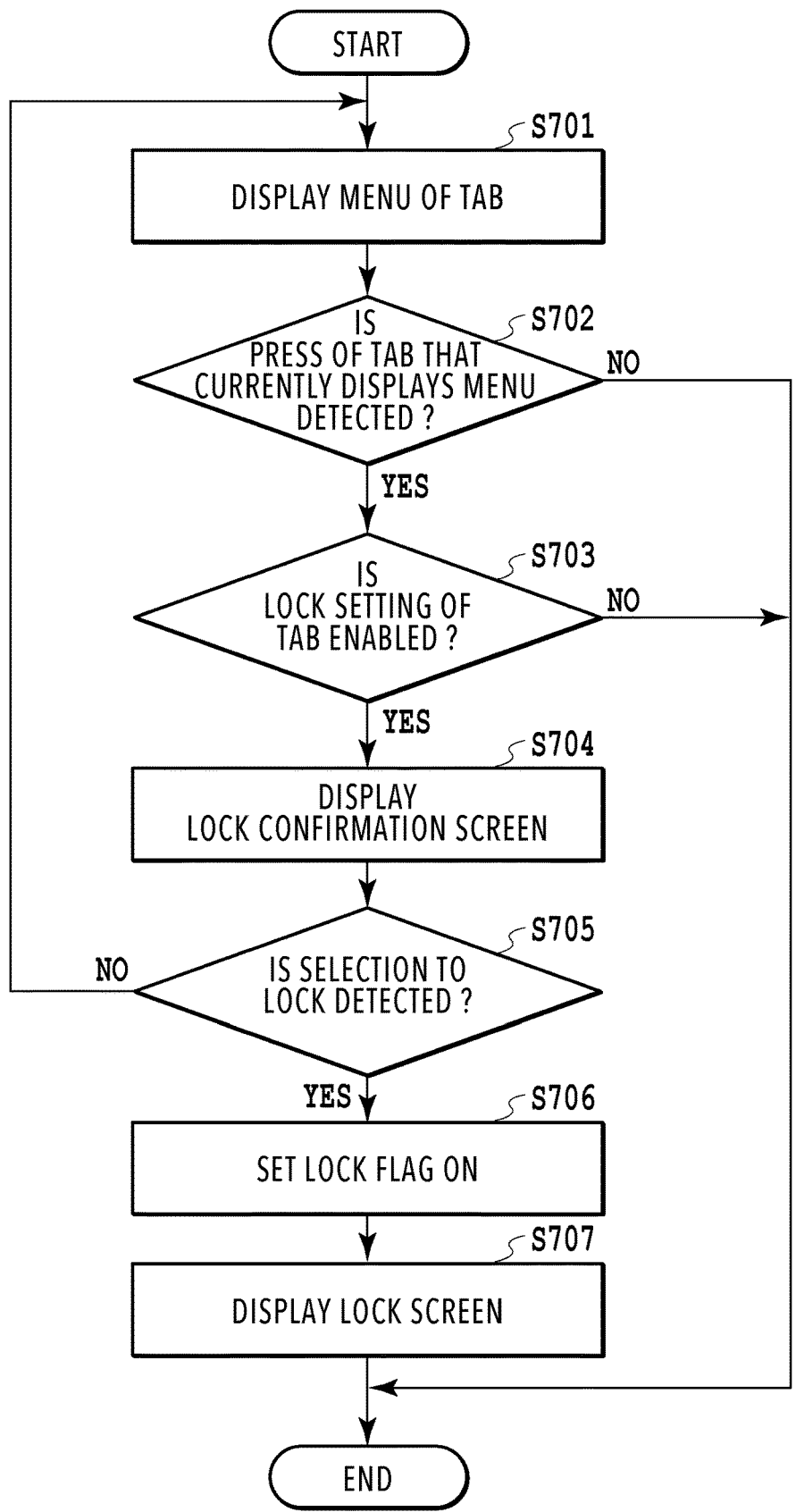
FIG. 7 is a flowchart showing a sequence to lock the custom home screen by a tab operation.

FIG. 7 is a flowchart for explaining a processing sequence in the case where the user locks the tab. A series of processing shown in this flowchart is implemented by causing the CPU 101 of the MFP 100 to load program codes stored in the ROM 102 into the RAM 103 and to execute the program codes. This processing is started in the case where the tab is set to a released state by a release operation of password authentication and the like by the user.

In S701, the CPU 101 displays the menu of the tab on the operation display unit 108. In S702, the CPU 101 determines whether or not the press of the tab of the menu currently displayed on the operation display unit 108 is detected. This processing is terminated in the case where the CPU 101 determines in this step that the press of the tab is not detected during the lapse of a predetermined time period, for example. On the other hand, in the case where the press of the tab is detected during this time period, the CPU 101 determines whether or not the lock setting of the tab is enabled in S703. As described above, the setting to enable or disable the lock setting of the tab is assumed to be carried out in advance for each tab. The processing is terminated in the case where the lock setting of the tab is disabled. In the case where the lock setting of the tab is enabled, a lock confirmation screen is displayed in S704. The lock confirmation screen is a display screen 850 in FIG. 8, for example. In the meantime, the user selects whether or not to lock the tab on the lock confirmation screen. The CPU 101 brings the processing back to S701 in the case of detection of a user operation for selecting not to lock the tab on the lock confirmation screen. In the case where selection to lock is detected in S705, the CPU 101 sets the lock flag on in S706. After displaying the lock screen in S707, the CPU 101 terminates the processing. This is the flow of the processing in the case of locking the tab by the user.

Next, the series of the flow to lock and unlock the tab in FIGS. 6 and 7 mentioned above will be described with reference to screens to be displayed on the operation display unit 108.

Figure 8:
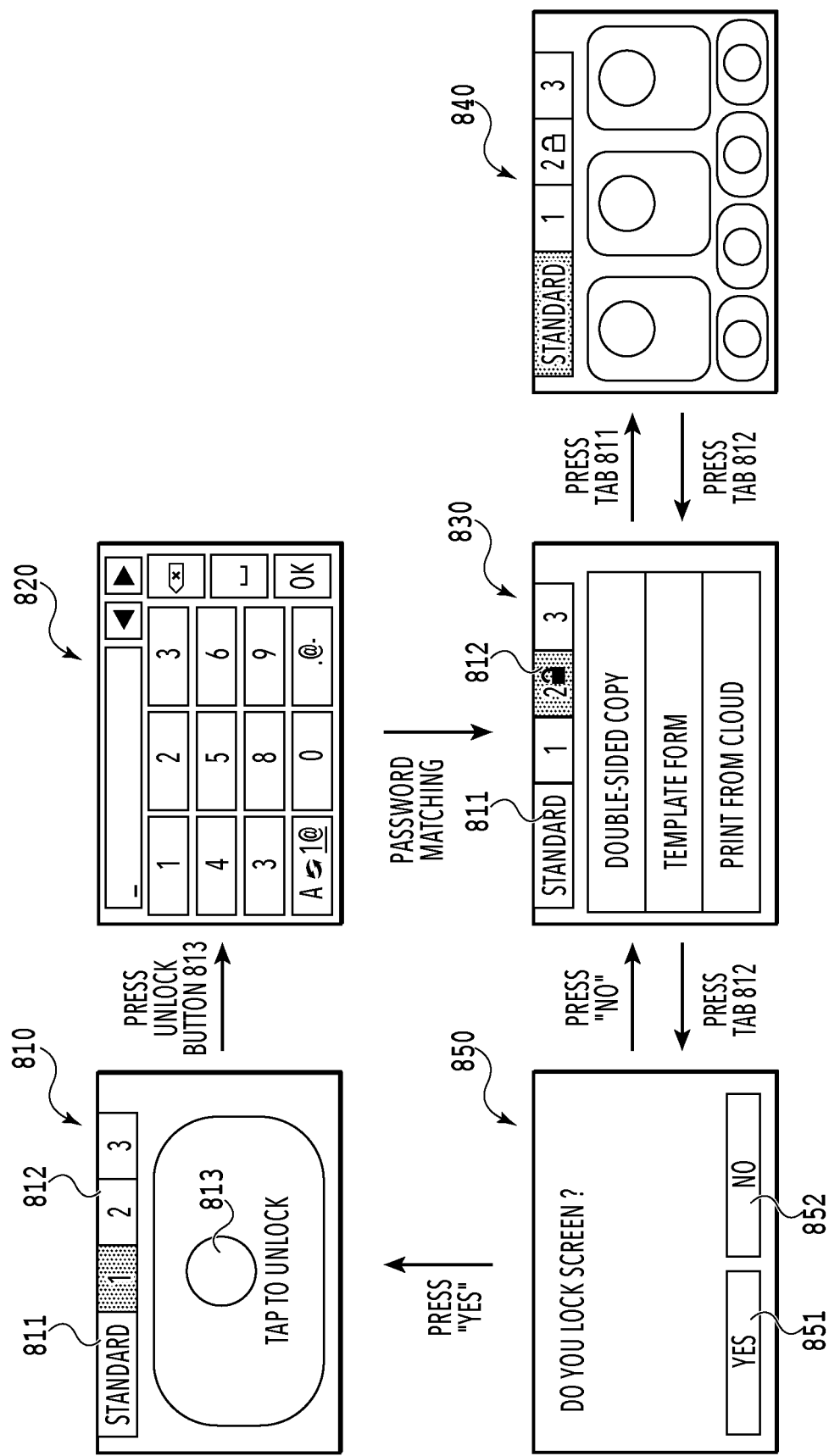
FIG. 8 shows diagrams for explaining screen transition of display screens.

FIG. 8 shows diagrams for explaining transition of display screens in a case of locking and unlocking the tab. First, a display screen 810 is a display screen in a case where the user presses a tab 812 for which the lock flag is turned on. The display screen 810 is a display screen corresponding to S601 to S603 in the flowchart in FIG. 6. A display screen 820 being the password input screen is displayed in the case where the user presses an unlock button 813 on this display screen 810. A display screen 830 is displayed in the case where the user inputs the correct password. This display screen 830 is a display screen corresponding to the tab 812, which is a screen corresponding to S607 in FIG. 6. Meanwhile, on the display screen 830, the tab 812 is provided with a mark indicating the unlocked state.

A standard home screen 840 is displayed in the case where the user presses a tab 811 being a standard tab on the display screen 830 of this tab 812. In this instance, the tab 812 in the unlocked state is retained in the unlocked state. In the case where the operation on the display screen 840 is completed and the user presses the tab 812 again, the display screen 830 is displayed without requiring the unlocking operation. Here, the display screen 850 is displayed in the case where the user presses the tab 812 with the mark indicating the unlocked state. Specifically, in the present embodiment, this tab functions as a re-lock button in the case where the menu of the tab is displayed. Here, the above description (that is, the screen transition from the display screen 830 to the display screen 850) is the screen transition corresponding to S702 to S704 in FIG. 7. The display screen 850 is the display screen to allow the user to select whether or not to lock the screen. In the case where the user presses a yes button 851, the tab 812 being the relevant tab is switched to the locked state. The display screen 830 is displayed in the case where the user presses a no button 852. This is the processing to lock and unlock the tab by using the display screen displayed on the operation display unit 108.

Next, a description will be given of a method of setting all the tabs enabled to undergo the lock setting to the locked state in the case where the backlight of the operation display unit 108 is turned off. The backlight of the operation display unit 108 is turned on in the case where the user operates the operation display unit 108 and is turned off for reducing the power consumption in the case where no operations by the user are detected for a predetermine time period in the on state.

Figure 9:
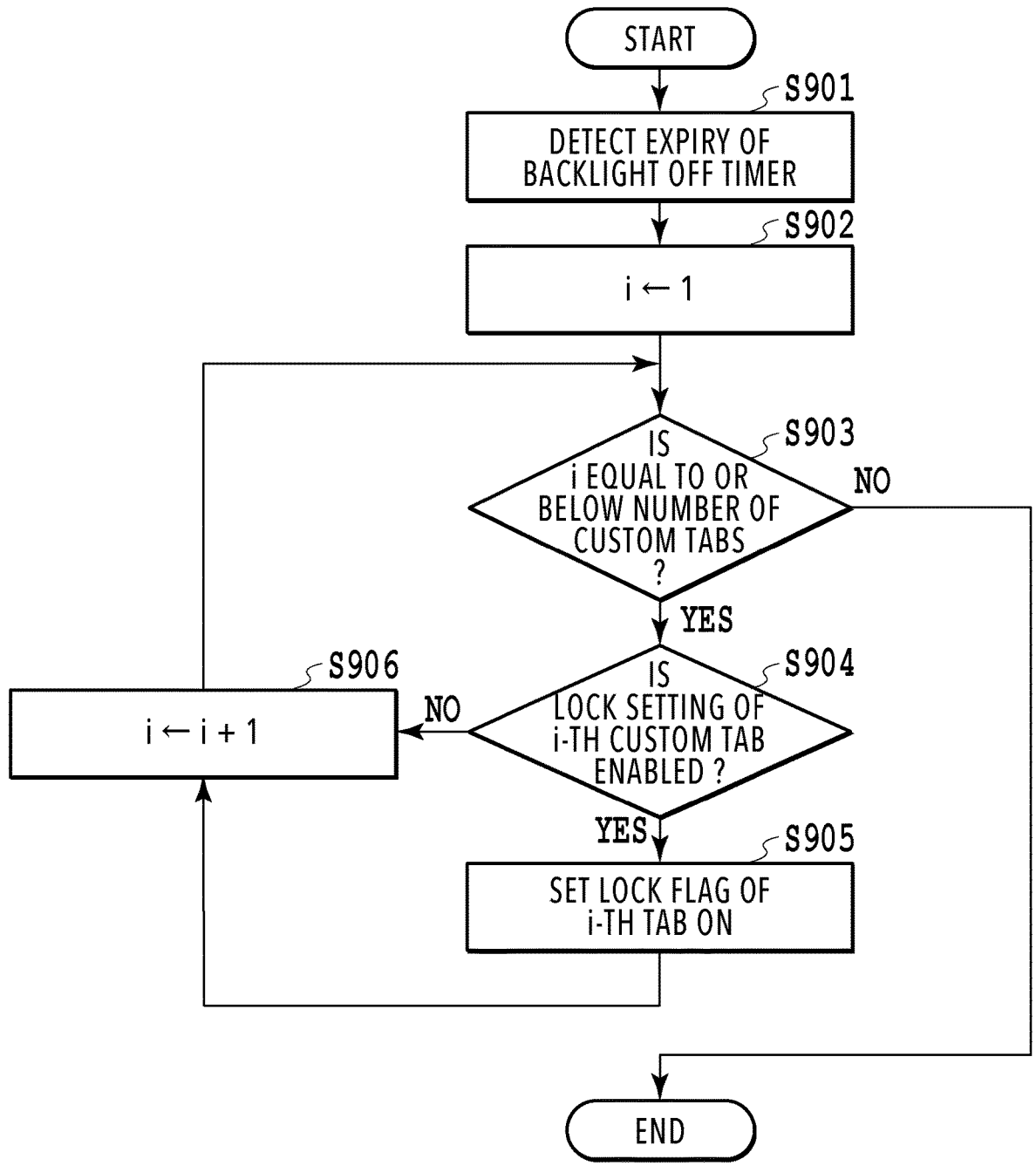
FIG. 9 is a flowchart showing a sequence to lock the custom home screen in a case where a backlight is turned off.

FIG. 9 is a flowchart for explaining a sequence of lock processing in the case where the backlight is turned off. A series of processing shown in this flowchart is implemented by causing the CPU 101 of the MFP 100 to load program codes stored in the ROM 102 into the RAM 103 and to execute the program codes.

In the case where the CPU 101 detects expiry of a backlight off timer in S901, the CPU 101 initializes an index i to 1 in S902. In S903, the CPU 101 determines whether or not the index i is equal to or below the number of the custom tabs. In the case where the index i is equal to or below the number of the custom tabs in S903, the CPU 101 determines whether or not the lock setting for an i-th custom tab is enabled in S904. In the case where the lock setting for the i-th custom tab is enabled, the CPU 101 sets the lock flag of the i-th custom tab on in S905.

In the case where the lock setting for the i-th custom tab is disabled in S904, the CPU 101 sets the lock flag of the i-th custom tab on in S905, and then adds 1 to the index i in S906. After carrying out S906, the CPU 101 performs determination again in S903 as to whether or not the index i is equal to or below the number of the custom tabs. The CPU 101 terminates this processing in the case where the index i is greater than the number of the custom tabs in S904. In this way, it is possible to lock the tabs sequentially in the ascending order of tab numbers until the index i is equal to the number of the custom tabs. In other words, it is possible to set all the tabs enabled to undergo the lock setting to the locked state at the timing to turn the backlight off. This processing makes it possible to lock all the tabs supposed to be set to the locked state after the lapse of a predetermined time period even in a case where the user forgets to perform an operation to log out and the like after completing the intended operation.

As described above, the present embodiment aims at improving operability of the display screen. To be more precise, in the case of transitioning from the screen of the currently displayed tab in the unlocked state to a different tab, the unlocked state of the tab before the transition is maintained. Thus, even in the case of carrying out the operation in such a way as to go back and forth between two tabs or more, for example, it is possible to avoid the trouble of carrying out the unlocking operation many times, thereby improving operability. Although the present embodiment has described the example of the display screen of the MFP 100, the present disclosure is not limited to this configuration. The present disclosure is applicable to any device as long as the device includes the operation display unit. Meanwhile, for example, the MFP 100 may cause a different apparatus (such as a smartphone and a PC) that communicates with the MFP 100 to display the respective screens described above for executing the setting of the MFP 100 and causing the MFP 100 to execute a variety of processing. Then, the present disclosure may be applied to the screens to be displayed on the different apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-127039, filed Aug. 9, 2022, which is hereby incorporated by reference wherein in its entirety.

What is claimed is:
1. A control apparatus comprising:
a first display controller configured to display a plurality of selection areas on a display unit;
a locking unit configured to control the control apparatus in a locked state being a state controlled in such a way that a first menu screen corresponding to a first selec- tion area is not displayed even in a case where the first selection area is selected from the plurality of selection areas;

a changing unit configured to change the state of the control apparatus from the locked state to a released state based on carrying out input of a predetermined password in the state where the control apparatus is controlled in the locked state, the released state being a state controlled in such a way that display of the first menu screen is enabled;

a second display controller configured to display a second menu screen corresponding to a second selection area being different from the first selection area on the display unit based on selection of the second selection area from the plurality of selection areas; and a third display controller configured to display the first menu screen without carrying out the input of the predetermined password in a case where the second menu screen is displayed after changing the state of the control apparatus from the locked state to the released state and the first selection area is selected after displaying the second menu screen.

2. The control apparatus according to claim 1, further comprising:

a controller configured to operate the control apparatus in a state for reducing power consumption based on absence of detection of an operation by a user for a predetermined time period; and a second changing unit configured to change the state of the control apparatus from the released state to the locked state based on the absence of detection of the operation by the user for the predetermined time period after changing the state of the control apparatus from the locked state to the released state.

3. The control apparatus according to claim 2, wherein the state for reducing power consumption is a state where a backlight of the display unit is turned off.

4. The control apparatus according to claim 1, further comprising:

a third changing unit configured to change the state of the control apparatus from the released state to the locked state based on carrying out a predetermined user operation for setting the control apparatus to the locked state after changing the state of the control apparatus from the locked state to the released state.

5. The control apparatus according to claim 4, wherein the predetermined user operation is an operation to select the first selection area in a state where the first menu screen is displayed after changing the state of the control apparatus from the locked state to the released state.

6. The control apparatus according to claim 1, wherein a plurality of menus included in the first menu screen are menus arbitrarily customizable by a user.

7. The control apparatus according to claim 6, wherein a plurality of menus included in a standard home screen corresponding to one selection area of the plurality of selection areas are menus not arbitrarily customizable by the user.

8. The control apparatus according to claim 1, wherein the first menu screen includes a predetermined copy menu for executing copying.

9. The control apparatus according to claim 1, further comprising:

a fourth display controller configured to display a confirmation screen for confirming whether or not to change the state of the control apparatus from the locked state to the released state in a case where the first selection area is selected in a state of the first menu screen controlled in the locked state; and a fifth display controller configured to display an input screen for inputting the predetermined password based on carrying out an operation on the confirmation screen, wherein the state of the control apparatus is changed from the locked state to the released state and the first menu screen is displayed based on carrying out input of the predetermined password on the input screen.

10. The control apparatus according to claim 1, wherein the plurality of selection areas are displayed in the display unit both in a state where the first menu screen is displayed and in a state where the second menu screen is displayed.

11. The control apparatus according to claim 10, wherein in the state where the first menu screen and the plurality of selection areas are displayed, the control apparatus is controlled in such a way that a color of the first selection area of the plurality of selection areas is different from a color of another selection area of the plurality of selection areas.

12. The control apparatus according to claim 1, further comprising:

a state controller configured to control the control apparatus between a state where lock setting is enabled and a state where the lock setting is disabled, the lock setting being a setting to control the state of the control apparatus between the locked state and the released state, wherein in the state where the lock setting is disabled, the control apparatus is not set to the locked state and the first menu screen is displayed without carrying out input of the predetermined password in the case where the first selection area is selected.

13. The control apparatus according to claim 12, wherein an icon indicating that the state of the control apparatus is in any of the locked state and the released state is displayed in the first selection area in the state where the lock setting is enabled, and the icon is not displayed in the first selection area in the case where the lock setting is disabled.

14. The control apparatus according to claim 12, wherein an operation for changing the state of the control apparatus between the state where the lock setting is enabled and the state where the lock setting is disabled is different from an operation for changing the state of the control apparatus between the locked state and the released state.

15. The control apparatus according to claim 1, further comprising:

a second locking unit configured to control the control apparatus in a second locked state being a state controlled in such a way that the second menu screen is not displayed even in the case where the second selection area is selected; and a second changing unit configured to change the state of the control apparatus from the second locked state to a second released state based on carrying out input of a specific password in the state where the control apparatus is controlled in the second locked state, the second released state being a state controlled in such a way that display of the second menu screen is enabled.

16. The control apparatus according to claim 1, wherein the plurality of selection areas are a plurality of tabs.

17. The control apparatus according to claim 1, wherein the control apparatus is a printer.

18. The control apparatus according to claim 1, wherein the control apparatus is an ink jet printer.

19. A controlling method for a control apparatus comprising:
- a first display controlling step of displaying a plurality of selection areas on a display unit;
- a locking step of controlling the control apparatus in a locked state being a state controlled in such a way that a first menu screen corresponding to a first selection area is not displayed even in a case where the first selection area is selected from the plurality of selection areas;
- a changing step of changing the state of the control apparatus from the locked state to a released state based on carrying out input of a predetermined password in the state where the control apparatus is controlled in the locked state, the released state being a state controlled in such a way that display of the first menu screen is enabled;
- a second display controlling step of displaying a second menu screen corresponding to a second selection area being different from the first selection area on the display unit based on selection of the second selection area from the plurality of selection areas; and
- a third display controlling step of displaying the first menu screen without carrying out the input of the predetermined password in a case where the second menu screen is displayed after changing the state of the control apparatus from the locked state to the released state and the first selection area is selected after displaying the second menu screen.

20. A non-transitory computer readable storage medium storing a program for causing a computer to perform a control method of a control apparatus, the program comprising instructions that, when executed by the computer, cause the computer to perform:
- a first display controlling step of displaying a plurality of selection areas on a display unit;
- a locking step of controlling the control apparatus in a locked state being a state controlled in such a way that a first menu screen corresponding to a first selection area is not displayed even in a case where the first selection area is selected from the plurality of selection areas;
- a changing step of changing the state of the control apparatus from the locked state to a released state based on carrying out input of a predetermined password in the state where the control apparatus is controlled in the locked state, the released state being a state controlled in such a way that display of the first menu screen is enabled;
- a second display controlling step of displaying a second menu screen corresponding to a second selection area being different from the first selection area on the display unit based on selection of the second selection area from the plurality of selection areas; and
- a third display controlling step of displaying the first menu screen without carrying out the input of the predetermined password in a case where the second menu screen is displayed after changing the state of the control apparatus from the locked state to the released state and the first selection area is selected after displaying the second menu screen.

* * * * *